United States Patent
Brown et al.

[19]

[11] Patent Number: 6,017,377
[45] Date of Patent: Jan. 25, 2000

[54] SPRAY PAINT BOOTH FILTER

[76] Inventors: Keith R Brown, 604 Valhalla Dr., Columbia, S.C. 29229; Ben Grizzard, 400 Old Georgia Rd., Moore, S.C. 29369

[21] Appl. No.: 09/018,001

[22] Filed: Feb. 3, 1998

Related U.S. Application Data

[60] Provisional application No. 60/037,178, Feb. 3, 1997.

[51] Int. Cl.$^7$ .................................................. B01D 45/08
[52] U.S. Cl. ................... 55/435; 55/440; 55/464; 55/502; 55/DIG. 31; 55/DIG. 46
[58] Field of Search ............... 55/440, 434, 435, 55/462, 464, 524, DIG. 46, 502, DIG. 31; 96/356

[56] References Cited

U.S. PATENT DOCUMENTS

| | | |
|---|---|---|
| 947,642 | 1/1910 | Leave . |
| 2,125,271 | 8/1938 | Dahlman ................................... 55/440 |
| 3,358,580 | 12/1967 | Freese et al. . |
| 3,566,585 | 3/1971 | Voloshen et al. ........................ 55/435 |
| 3,771,430 | 11/1973 | Lane . |
| 3,802,158 | 4/1974 | Ohle . |
| 3,932,151 | 1/1976 | Lau . |
| 3,955,949 | 5/1976 | Rohrer . |
| 4,112,037 | 9/1978 | Parker et al. ............................ 264/126 |
| 4,175,938 | 11/1979 | Regehr et al. . |
| 4,276,064 | 6/1981 | Gerdes . |
| 4,283,209 | 8/1981 | Schmalhofer . |
| 4,321,064 | 3/1982 | Vargo . |
| 4,334,889 | 6/1982 | McConnell . |
| 4,475,447 | 10/1984 | Kock . |
| 4,770,118 | 9/1988 | Vohringer et al. . |
| 4,874,412 | 10/1989 | Nowack . |
| 4,897,095 | 1/1990 | Bedi et al. . |
| 4,955,990 | 9/1990 | Napadow . |
| 5,169,417 | 12/1992 | Straub . |
| 5,268,011 | 12/1993 | Wurz . |
| 5,352,257 | 10/1994 | Powers . |

FOREIGN PATENT DOCUMENTS

| | | | |
|---|---|---|---|
| 828547 | 12/1969 | Canada | .................................... 55/440 |
| 3439255 | 4/1986 | Germany | .................................. 55/502 |

*Primary Examiner*—David A. Simmons
*Assistant Examiner*—Robert A. Hopkins
*Attorney, Agent, or Firm*—Michael A Mann; Nexsen Pruet Jacobs & Pollard LLP

[57] ABSTRACT

A reusable filter for use in a spray paint booth is advanced which includes a frame supporting a series of equally spaced horizontal vanes. Each vane is formed to have a shape which reduces clogging of the front face of the filter and forces the air stream to make successive directional changes to thereby effectively remove particulates from the air stream. Three sides of the frame are equipped with a bendable lip that provides a fluid tight seal between the wall and the frame. The fourth side of the frame is formed with access holes enabling paint particulates and liquid cleanser to be quickly removed from between the vanes. The filter is made of a polymeric material which is impervious to solids and can be cleaned by any cleaner normally used to remove paint from a surface.

8 Claims, 2 Drawing Sheets

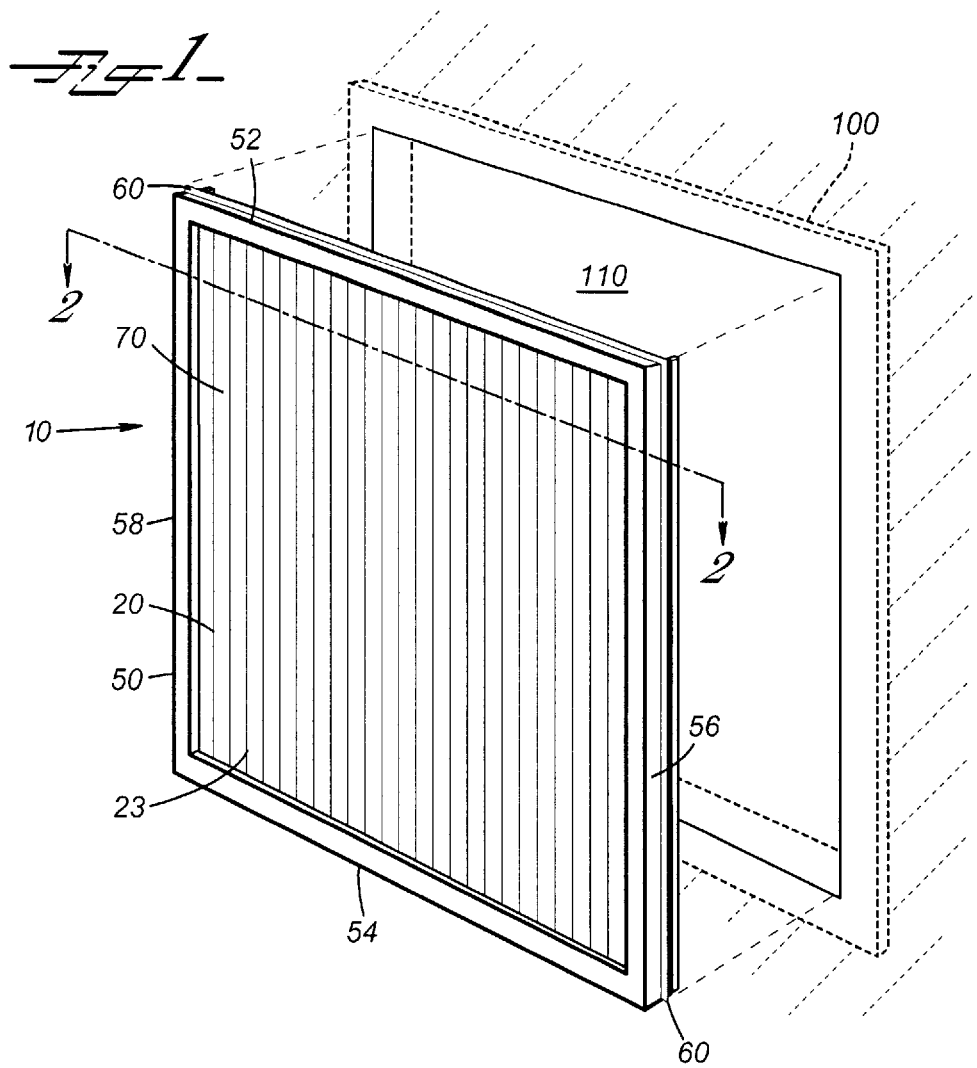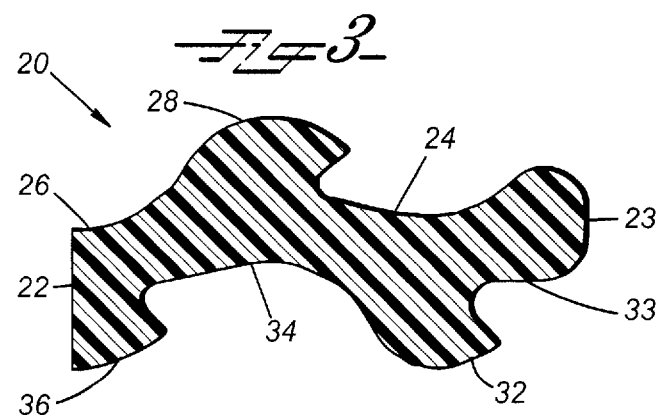

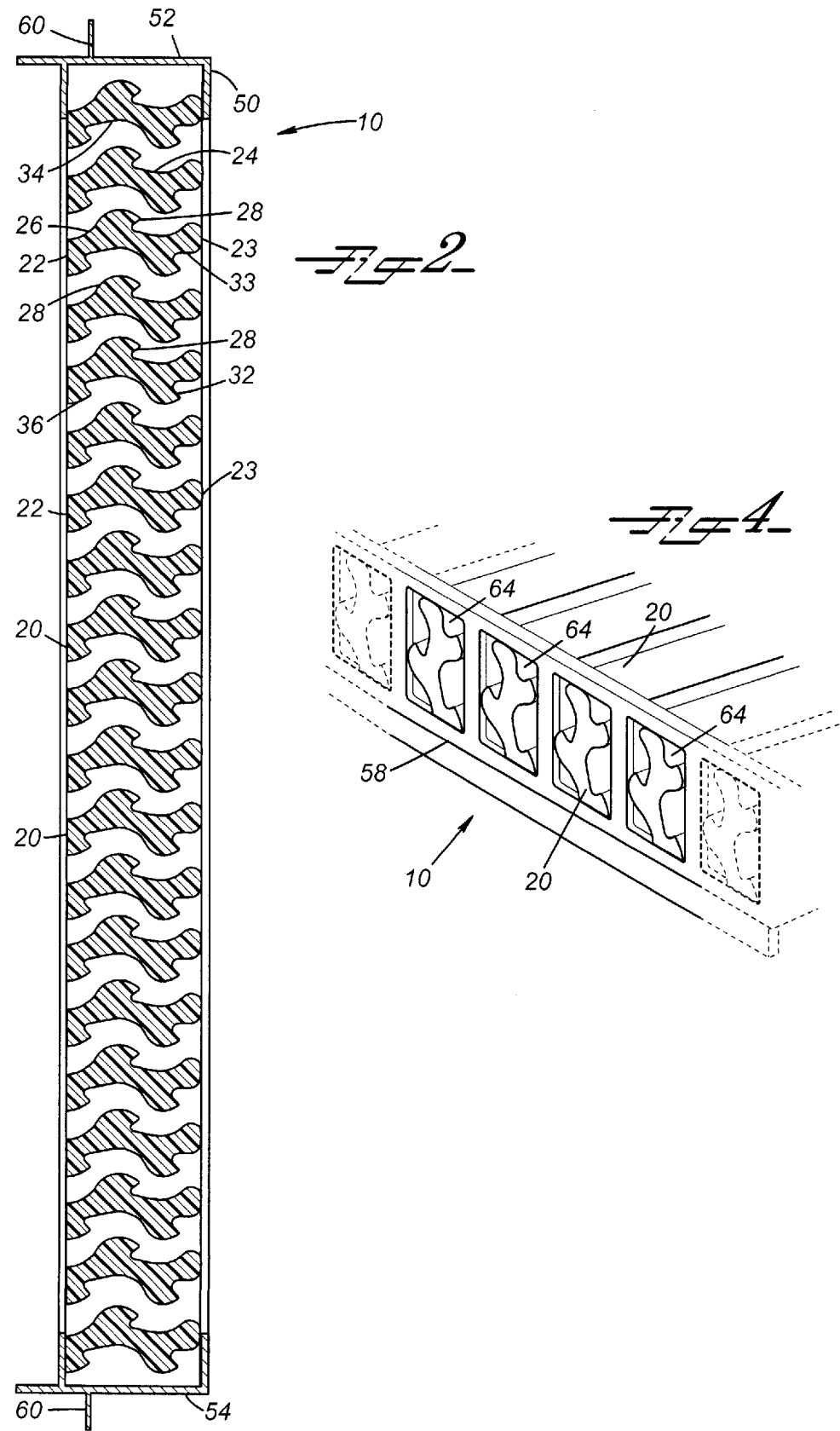

SPRAY PAINT BOOTH FILTER

This application claims the benefit of provisional patent application Ser. No. 60/037,178 filed Feb. 3, 1997, now expired.

FIELD OF THE INVENTION

The present invention relates generally to filters used to remove paint particles entrained in the air stream in a spray paint booth. More particularly, the present invention is a reusable, spray paint filter having a vane configuration which effectively removes paint from the air and prevents clogging of the filter face.

BACKGROUND OF THE INVENTION

Current Clean Air Regulations require air pollution sources to remove a certain percentage of particulates from air streams generated by air pollution sources. This particulate removal is accomplished by a variety of existing commercial devices including paper or cloth filters, centrifugal separation, electrostatic precipitation, water bath filtration and HEPA filters. The choice of removal apparatus is dictated by the size and concentration of the particulate material that must be removed.

By far the largest source of particulate emissions (in terms of number of emission sources) is industrial painting operations. In normal industrial painting operations, the object to be painted is introduced into a spray booth or room. The object is spray painted using an atomizing device in operational connection with a source of compressed air. The "over-spray," that is, paint particles remaining in the air, is then removed from the spray booth to provide a healthier work environment and to minimize the accumulation of paint residue within the work area.

Removal of airborne paint particles is normally accomplished by filtering the air stream and subsequently venting the filtered air to the external atmosphere. The filtering procedure involves the use of high volume fans that draw the air through filters normally placed within the walls or ceiling of the spray booth. Most industrial applications employ disposable paper filters, which when saturated with paint particles, are discarded and replaced. The replacement of these paper filters is costly from both a production and environmental perspective.

Therefore, there exists a need for a reusable filter for a paint spray booth that may be cleaned and reused, yet effectively removes particulate matter from an air stream.

SUMMARY OF THE INVENTION

According to its major aspects and briefly stated, the present invention is a reusable filter. The filter is comprised of a frame which supports a series of equally spaced horizontal vanes. Each vane is formed to have a series of restrictions that effectively removes particles from the air stream by forcing the air to change direction. In addition, each vane contains a lateral channel spaced a distance behind the front face of the vane, which provides a receptacle for the paint and prevents deposition on the front face of the filter. One side of the frame is formed with a series of access holes allowing the filter to cleaned more efficiently. Positioned about the exterior surface of the frame is a vertically positioned bendable lip. When the filter is placed within the wall, this lip bends towards the frame and provides a fluid tight seal between the wall and the frame. The filter is made of a polymeric material which is impervious to solvents and in most cases can be cleaned by sweeping with a broom or by any cleaner normally used to remove paint from a surface. Preferably, the polymer contains an anti-static agent which reduces the occurrence of paint particulates adhering to the surface of the vane. The filter may be manufactured to conform to any size wall opening.

A major feature of the present invention is the shape of the vanes. As the air enters the opening between the vanes, it is introduced to an area of reduced cross section which increases its velocity. Subsequent to the increase in velocity, the vane shape requires the air to flow in a substantially tangential direction. When the air is forced to change direction, its flow pattern creates an area of nearly zero velocity and causes the development of a low pressure region, which in turn results in the separation of the particles from the air stream. Once separated, the paint particles collect in channels formed in the vanes. The vane shape forces the air to change direction three times before exiting the filter and effectively maximizes the removal of the particulates from the air stream. Compared to other filters, air flow resistance has been reduced so that air flow is dramatically increased.

Still another advantage gained by the shape of the vane is that the lateral channel formed behind the front face of the vane assists the filter from becoming clogged. By reducing the incidence of clogging, the filter is capable of obtaining a longer cycle time, which results in enhanced production efficiency and longer periods of operational efficiency.

Still yet another feature of the present invention is the use of access holes in conjunction with the shape of the veins which enables the filter to be cleaned more efficiently. The shape of the veins allows almost all the particulate to be trapped in the first two channels so that when the filter needs to be cleaned, it can simply be swept. This allows the paint particles to fall from the surface of the vanes out through the access holes. Moreover, when a liquid cleaner is used, the access holes enables the fluid to drain quickly from the surface of the drains.

Still yet another feature of the present invention is the use of a polymeric material in combination with anti-static agent. The use of a polymer provides a surface which can be easily cleaned while the anti-static agent reduces the static electricity on the surface of the filter. This combination prevents paint particles from sticking to the surface of the vanes, which in turn allows the effective removal of paint from the vanes. By removing substantially all of the paint from the vanes, the filter can be repeatedly recycled and thereby reduces both operational costs and the deleterious impact on the environment. Moreover, the anti-static agent reduces the risk of a spark that may ignite a flammable paint. The anti-static agent serves a twofold purpose of not only allowing easy removal of paint from the filter, but also increasing safety by reducing the risk of igniting the paint.

Still another feature of the present invention is the lip formed about the perimeter of the frame. When the present filter is inserted into the wall, the lip surrounding it bends forward to form a fluid tight seal, and thus prevents paint from passing through the space between the filter and the wall. By preventing paint from passing through this interstitial area, damage to, and subsequent repair time on, the suction fans is minimized. Moreover, the filter prevents the particulate from escaping to the atmosphere.

Other features and advantages will be apparent to those skilled in the art from a careful reading of the detailed description of a preferred embodiment accompanied by the following drawings.

BRIEF DESCRIPTION OF THE DRAWINGS

In the drawings,

FIG. 1 is an exploded, perspective view of a filter according to a preferred embodiment of the present invention with the insertion hole of a wall shown illustrated in ghost;

FIG. 2 is a cross sectional side view of a filter according to a preferred embodiment of the present invention;

FIG. 3 is a detailed, cross sectional side view of a vane for a filter according to a preferred embodiment of the present invention; and FIG. 4 is a partial perspective of a filter according to a preferred embodiment of the present invention.

DETAILED DESCRIPTION OF PREFERRED EMBODIMENT

According to its major aspects and briefly stated, the present invention is a reusable filter for a paint spray booth that minimizes the occurrence of clogging and maximizes the removal of particulates from an air stream. Referring now to FIG. 1, there is shown an exploded, perspective view of a filter according to a preferred embodiment and generally designated by reference numeral 10. Filter 10 comprises a plurality of horizontally positioned vanes 20 held in position by a frame 50. Frame 50 is comprised of a top 52, a bottom 54 and opposing sides 56 and 58. Extending vertically from top 52, bottom 54 and side 56 is a lip 60. Lip 60 is bendable and bends toward front 22 of filter 10 when filter 10 is placed in hole 110 of wall 100. Lip 60 serves to hold filter 10 in place and prevents air and paint from passing through the interstitial space between frame 50 and the perimeter of hole 110.

Referring now to FIG. 4, formed along side 58 of frame 50 are a series of access holes 64. Access holes 64 enable paint particles and fluid cleaners to be quickly and effectively removed from between vanes 20. Vanes 20, frame 50 and lip 60 can be made of any material impervious to paint particles. Preferably, vanes 20, frame 50 and lip 60 are made of a polymeric material with a quantity of anti-static agent added. The use of silica and monoglyceride is well known in the art for purposes of anti-static. It is also preferred that approximately 140 grams of anti-static agent be added to every 100 pounds of polymer. Filter 10 can be manufactured to fit any size hole 110 by simply cutting vanes of the desired length and stacking them to the desired height. Although filter 10 preferably contains 20 vanes, the number of vanes can be increased to increase efficiency.

Referring now to FIGS. 2 and 3, there is shown a detailed cross sectional side view and a cross sectional side view of vanes 20, respectively. Each vane 20 is formed having front face 22, a rear face 23, an upper crest 28, a first lower crest 32, and a second lower crest 36. Additionally, each vane has a first channel 24 located between front face 22 and upper crest 28, and a second channel 26 positioned between rear face 23 and upper crest 28. A first recess 33 is positioned between first lower crest 32 and front face 22 while a second recess 34 is located between first lower crest 32 and second lower crest 36.

Vanes 20 are positioned horizontally, a preselected distance apart from one another. Each vane 20 is positioned so that the horizontal plane defined by the apex of upper crest 28 is the same as or above the horizontal plane defined by the lowest point of first lower crest 32 of the vane 20 immediately above. This spatial relationship between vanes 20 ensures that air traveling therethrough will be forced to assume a non-linear path. It is recognized that the apex of lower crest 32 of vane 20 should not be placed above the horizontal plane defined by the apex of upper crest 28 of the vane 20 below since this would provide the potential for a portion of the air stream to travel linearly through filter 10. However, it is also recognized that the horizontal plane of first lower crest 32 may be below the plane defined upper crest 28 of the vane 20 below it. The exact distance between vanes 20 is a function of the size and concentration of the particles entrained within the air stream and therefore, the spacing of vanes 20 will require a modest amount of experimentation commonly undertaken by those with ordinary skill in the art.

When it is desired to clean filter 10, a modest amount of force is used to remove filter 10 from wall 100. Thereafter, filter 10 is rotated so that access holes 64 are facing downward. The paint particles residing within filter 10 will fall through access holes 64. Filter 10 may also be cleaned by any fluid cleanser normally employed in the art. As with the paint particles, the fluid cleaner will drain through access holes 64. Thereafter, filter 10 is reinserted into wall 100 for further use.

Although filter 10 has been described in conjunction with the removal of paint particles from an air stream, it will be recognized by those with ordinary skill in the art that filter 10 may be used to remove other types of particulate matter entrained within an air stream and that such applications are within the spirit and scope of the present invention.

What is claimed is:

1. A filter for removing particulate from air, said filter comprising:

a frame; and a plurality of veins carried by said frame, each vein of said plurality of veins being spaced apart from other veins of said plurality of veins so as to define a path therebetween for a flow of air, and said each vein being formed to provide restrictions in said path, said restrictions being formed to provide changes in direction of said path, and lateral channels on the outside of said restrictions wherein the width of said path expands laterally at said lateral channels and the velocity of said air flow along said path into said channels is reduced, thereby creating an airflow in said channels that is tangential to said path and on the outside of said restrictions so that, when said airflow approaches said restrictions, said tangential airflow velocity increases and particulate carried by said tangential airflow is deposited into said channels.

2. The filter as recited in claim 1, further comprising means, carried by said plurality of veins, for minimizing the adherence of particulate to said veins when air containing particulate flows through said filter.

3. The filter as recited in claim 2, wherein said minimizing means is an anti-static agent.

4. The filter as recited in claim 3, wherein said anti-static agent is approximately 40 grams of said anti-static agent per 100 pounds of said polymeric material.

5. The filter as recited in claim 2, wherein said minimizing means is monoglyceride.

6. The filter as recited in claim 11, wherein said plurality of veins are made of a material impervious to said particulate.

7. The filter as recited in claim 11, wherein said plurality of veins are made of a polymeric material.

8. The filter as recited in claim 1, further comprising a lip extending from said bottom end of said frame to secure said filter.

* * * * *